United States Patent [19]

Lanziolotta

[11] 3,850,750

[45] Nov. 26, 1974

[54] PREPARATION OF D-(−) PANTOIC ACID AND/OR D-(−) PANTOYL LACTONE

[75] Inventor: Raymond P. Lanziolotta, San Jose, Calif.

[73] Assignee: Syntex Corporation, Republic of Panama, Panama

[22] Filed: June 4, 1973

[21] Appl. No.: 366,296

[52] U.S. Cl. .................................................. 195/30
[51] Int. Cl. ............................................... C12d 1/02
[58] Field of Search ................................. 195/30, 2

[56] References Cited
UNITED STATES PATENTS
3,600,279   8/1971   Takahashi et al. ..................... 195/30
FOREIGN PATENTS OR APPLICATIONS
46-6396   2/1971   Japan .................................... 195/30

Primary Examiner—Alvin E. Tanenholtz
Attorney, Agent, or Firm—Lawrence S. Squires; William B. Walker

[57] ABSTRACT

Stereoselective microbiological processes for preparing D-[−] pantoic acid and/or D-[−] pantoyl lactone. The processes are characterized by stereoselectively reducing α-ketopantoic acid and/or α-ketopantoyl lactone via contact with the fungus Byssochlamys, an ascomycete in the family Endomycetaceae in the order Endomycetales. The resulting D-[−] pantoic acid and/or D-[−] pantoyl lactone have utility as intermediates for pantothenic acid which is a well known member of the Vitamin B complex family.

9 Claims, No Drawings

PREPARATION OF D-(−) PANTOIC ACID AND/OR D-(−) PANTOYL LACTONE

BACKGROUND OF THE INVENTION

1. The Invention

This invention relates to microbiological processes for reducing α-ketopantoic acid and/or α-ketopantoyl lactone to pantoic acid or pantoyl lactone. In a further aspect this invention relates to a microbiological process for stereo-selectively reducing α-ketopantoic acid and/or α-ketopantoyl lactone to D-[−] pantoic acid and/or D-[−] pantoyl lactone using a strain of the fungal species *Byssochlamys fulva*.

2. The Prior Art

Pantoic acid (i.e., α-hydroxy-β,β-dimethyl-γ-hydroxybutyric acid) and pantoyl lactone (i.e., α-hydroxy-β,β-dimethyl-γ-butyrolactone) are important intermediates for the synthesis of D-[+] pantothenic acid, a member of the Vitamin B complex, typically sold as the calcium salt, i.e., D-[+] calcium pantothenate. It should be also noted that while the D-[+] isomer of pantothenic acid is a valuable nutritional agent for both humans and domestic animals, the L-[−] isomer has no nutritional value. Thus, in the typical commercial preparation of this vitamin by the reaction of β-alanine with pantoyl lactone, only the D-[−] isomer of pantoyl lactone is used to ensure that only the nutritionally desirable isomer is obtained (note; stereoinversion occurs during the reaction and thus a D-[−] starting material yields a D-[+] product). Unfortunately, however, the chemical processes for producing pantoyl lactone or pantoic acid yield a racemic mixture of the D-[−] and L-[+] isomers. The racemic mixture thus must be resolved to obtain the D-[−] isomer while the L-[+] isomer must be either discarded or converted back to the original α-keto starting material. Hence, it would be commercially desirable to develop a stereoselective process which produces high yields of the D-[−] isomer without producing the L-[+] isomer or producing only very low yields of the L-[+] isomer. Not unexpectantly, a number of microbiological processes have been attempted or proposed by the prior art. However, because of the unpredictability of microbiological processes, both as to whether the particular microorganism will actually effect a meaningful conversion and further whether it will be stereoselective to the desired isomer, the preselection of the proper organism is virtually impossible. For example, Kuhn and Wieland (zur Biogenese der Pantothensauve, Ber deut. chem. Ges, 75B, 121–123) describe a yeast cell suspension which reportedly reduced ketopantoyl lactone with apparently high stereoselectivity to form the D-[−] isomer. However, in attempting to duplicate their results, it was found that the high specific rotation of the isolated product was not due to a high degree of asymmetric reduction affected by the microorganism but rather was due to selective resolutions which inherently occurred during the recrystallization purification procedures used by Kuhn and Wieland. Japanese Patent No. 6396/71 describes a procedure which appears to produce the D-[−] isomer with some degree of stereoselectivity using certain microorganisms although again it is not clear whether the reported high degree of stereoselectivity is due to the microorganism or to undisclosed purification procedures. Accordingly, I have now discovered microbiological reduction processes for producing D-[−] pantoyl lactone and/or D-[−] pantoic acid using a genus of microorganisms not suggested by the Japanese patent and further which afford greater percent conversions; higher yields; virtually 100 percent stereospecificity; shorter process times and which uses a simple, comparatively inexpensive nutrient medium and further which can be applied to higher substrate concentrations, thus further increasing equipment yield.

SUMMARY OF THE INVENTION

The microbiological processes of our invention for stereoselectively producing D-[−] pantoyl lactone and/or D-[−] pantoic acid comprise exposing α-ketopantoyl lactone and/or α-ketopantoic acid, or mixtures thereof, to a strain of the fungus *Byssochlamys fulva* under conditions which are conducive to stereospecific reduction in high yields.

The invention will be further described herein below.

DESCRIPTION OF THE INVENTION AND PREFERRED EMBODIMENTS

As noted above in the summary, the process of the invention comprises contacting α-ketopantoyl lactone and/or α-ketopantoic acid with the ascomycete *Byssochlamys fulva*. This treatment can be effected by contacting the α-ketopantoyl lactone and/or α-ketopantoic acid with the particular strain of fungi, cultured in a suitable nutrient medium under aerobic conditions. In general, the conditions for culturing the microorganism for the purpose of this invention are as follows. The microorganism is aerobically grown in a suitable fermentation medium. A suitable medium comprises a nitrogeneous substance, minerals and a source of carbon and energy. The latter can be a carbohydrate such as, for example, glucose, fructose, and mannose and mixtures thereof. The source of nitrogeneous factors can, for example, be a natural source such as, for example, cotton seed derived protein nutrient (Pharmamedia), soybean meal, corn steep liquor, meat extract, distillers solubles and the like and mixtures thereof, or synthetic — i.e., composed of simple, synthesizable organic or inorganic compounds such as, for example, ammonium salts, alkali nitrates, amino acids, proteins, nucleic acids or urea and the like and mixtures thereof. The minerals are frequently present in the nutrient medium as components of, or impurities in, the sources of the nitrogen and/or carbon and energy. Desirably, the mineral sources should contain sources of heavy metals such as, for example, zinc, iron, copper, manganese, beryllium, gallium or the like. Also, the nutrient medium can optionally contain various vitamins which are conducive to the fungi. Further, since the fermentation is conducted aerobically, it is desirable to provide a sterile air supply to ensure that sufficient oxygen is maintained during fermentation. The air (or oxygen source) can, for example, be provided by the conventional methods used in submerged aerated culture.

The fermentation is conducted, both during the culturing and the reduction reaction, at temperatures which are conducive to the particular strain of fungi used and accordingly optimum temperatures can vary slightly with the particular strain of fungi used. Typically, the fermentation is conducted at temperatures in the range of about from 25° to 37°C and optimum temperatures typically fall within the range of about from 27° to 30°C. I have further surprisingly found that best results are obtained by conducting the reduction reaction at pHs which would not be optimum for the growth of the microorganism but rather by conducting the reduction reaction at pHs in the range of about from 2 to 4, preferably 2.5 to 2.6. The initial culturing of the fungus is, of course, conducted at pHs which are conducive to the growth of the microorganism, i.e., typically about from 4 to 7 and preferably about from 5 to 6.

Accordingly, since the reduction reaction is conducted at pHs which are not particularly conducive to the microorganism, it is necessary to add the α-ketopantoyl lactone and/or α-ketopantoic acid to a nutrient medium which has already been cultured with the microorganisms. The culture medium is conveniently prepared, using the conditions described herein above, by inoculating the fermentation medium with the microorganism and then incubating until microbial growth is termed heavy. Typically, the growth period, from initial inoculation to addition of the ketopantoyl lactone and/or ketopantoic acid, is about from 24 to 48 hours, but will, of course, vary with the culturing conditions and quantities of microorganism desired. The α-ketopantoyl lactone and/or α-ketopantoic acid substrate can then be conveniently added to the culture either as an aqueous solution or as the crystalline solid.

The reduction reaction is conducted using concentrations of α-ketopantoyl lactone and/or α-ketopantoic acid in the range of about from one to six grams, preferably about from two to four grams, per 100 ml. of culture medium. The incubation is continued for a sufficient length of time to effect the desired reduction and typically varies about from 48 to 72 hours depending on the particular concentration and microorganism used. Also typically the addition of the α-ketopantoyl lactone and/or α-ketopantoic acid is sufficient to lower the pH of the fermentation medium to the prescribed range, without further adjustment. Further, it is desirable to agitate the medium during the fermentation to ensure an adequate gaseous exchange and mass transfer.

The strains used in the practice of my invention are known microorganisms and can be obtained from depositories of Byssochlamys cultures such as, for example, the American Type Culture Collection (ATCC)-12301 Portland Drive, Rockville, Md.; the Northern Utilization Research and Development Division, United States Department of Agriculture, Peoria, Ill. (NRRL); and the Quartermaster Research and Development Center, United States Army, Natick, Mass. (QM). Centraal Bureau voor Schimmelcultures, Baarn, Netherland (CBS) and the Commonwealth Mycological Institute, Kew, Surrey, England (IMI). I have further found that exceptional conversions and stereoselectivities are obtained by using the strain or strains of Byssochlamys identified as *Byssochlamys fulva* 1125 NRRL, QM 6766, 135.62 CBS, ATCC 10099 and 163641 IMI or their equivalent.

The α-ketopantoyl lactone and α-ketopantoic acid substrates are known compounds and are readily obtained from commercial sources or prepared according to known procedures.

After the stereoselective conversion has been completed, the D–[–] pantoic acid and/or D–[–] pantoyl lactone can be separated from the incubation media by any suitable separation procedure, for example, extraction, chromatography, crystallization. In a preferred mode of my process, the fermentation broth is adjusted to pH 1.0 and held at 50°C for about 15 minutes. In this way any pantoates present in the fermentation broth are converted to the corresponding lactone. The microorganisms can then be removed by any convenient method, for example, centrifugation and/or filtration. The broth is then extracted with any suitable solvent, e.g., methylene dichloride, methyl isobutyl ketone, isopropyl acetate or ethyl acetate. The solvent is evaporated and the pantoyl lactone present in the residue can be further purified by recrystallization, e.g., from hot toluene.

As previously noted, D–[–] pantoyl lactone and D–[–] pantoic acid are intermediates for the nutritionally useful vitamin pantothenic acid and its common commercial salt calcium pantothenate. This conversion can be effected according to known procedures such as, for example, are described or referred to in U.S. Pat. Nos. 2,845,456 and 3,564,052 (calcium pantothenate).

A further understanding of the invention can be had from the following nonlimiting illustrative examples.

EXAMPLE 1

An agar slant of *Byssochlamys fulva* strain 135.62 CBS is prepared employing an aqueous nutrient medium composed of 3 percent, vol., glucose, 1.5 percent, vol., agar and 3 percent, vol., of a protein nutrient mixture (containing cotton seed derived protein (55 percent, wt., min.), polysaccharides, nucleic acid, minerals and vitamins) sold under the trademark Pharmamedia by the Traders Protein Division, Traders Oil Mill Company, Fort Worth, Tex., and further identified by assay on pages 4 and 10 of the Traders Protein Division publication booklet entitled Cottonseed Nutrients Ideal for Industrial Fermentations. The slant is incubated for 14 days at 28°C. After which the surface growth is harvested with 4 ml. of sterile, distilled water. The resulting suspension is used to innoculate a 250 ml. conical flask containing 50 ml. of nutrient medium (hereinafter referred to as Medium GP) composed of 40 g. glucose and 30 g. of the aforedescribed protein nutrient mixture Pharmamedia in 1000 ml. of distilled water. The flask is incubated on a rotary shaker at 300 rpm with one inch excursion for 72 hours at 28°C. The entire contents of the flask is then aseptically transferred to three volumes of sterile, distilled water and homogenized. One milliliter of the resulting suspension is used to innoculate each of a series of 250 ml. conical flasks containing 50 ml. of Medium GP. The innoculated medium is then incubated for 48 hours at 28°C on a rotary shaker as before. 1500 Milligrams of α-ketopantoyl lactone is then added to each flask in the form of an aqueous solution containing 500 mg. of α-ketopantoyl lactone per milliliter and the incubation continued. The resulting substrate concentration was approximately 30 mg. of α-ketopantoyl lactone per ml. of fermentation medium. One milliliter samples are periodically aseptically withdrawn from the culture medium and acidified to pH of 0.8 to 1.0 with concentrated hydrochloric acid and then maintained at 50°C for 15 minutes to ensure that all of the pantoates, present in the sample, are converted to the corresponding lactone. The samples are then saturated with sodium chloride and extracted with 4 ml. of ethyl acetate. A portion of the ethyl acetate extract is then subjected to quantitative gasliquid chromatography (GLC) to determine the amount of α-ketopantoyl lactone and pantoyl lactone in the sample and correspondingly the percent conversion. The percent conversion at 48 hours was 92 percent.

Recovery of pantoyl lactone from spent cultures for determination of the specific rotation was accomplished by differential extraction essentially as described by Kuhn and Wieland in zur Biogenese der Pantothensauve, Ber deut. chem. Ges, 75B, 121–123. Cells were removed from the culture broths by centrifugation. The supernatant fluid was then adjusted to pH 1.0 with hydrochloric acid; held at 50°C for 15 minutes and then titrated to pH 7.3 by the addition of sodium hydroxide and then immediately extracted three times with a half volume of ethyl acetate. The extracts were combined, dried over anhydrous sodium sulfate and the solvent stripped in vacuo. Portions of the crude residues that resulted were shown to be virtually free of unreacted ketopantoyl lactone by quantitative GLC. Each 100 mg. of crude residue was then taken up in 10 ml. of a 60:40 mixture of benzene:ethyl acetate to which was added 300 mg. of silica gel. The mixture was slurried and then filtered through a telfon membrane and the filtrate stripped to remove the solvent. The optical rotation of the product residue is then determined by dissolving a sample of the residue in methanol and then determining optical rotation by an automatic polarimeter. The optical rotation in methanol was determined to be $[\alpha]_D$methanol $= -27.6$ percent thus indicating that the product was virtually completely the D-[−] isomer. Optical rotation for the pure D-[−] pantoyl lactone isomer, $[\alpha]_D$methanol $= -27.8°$ ($\pm 0.1$).

Similarly by following the same procedure but using the strain of Byssochlamys fulva indicated in the following table and a substrate contact time of 72 hours the corresponding conversions and optical rotations were obtained.

TABLE 1

| Microorganism | Depository Accession Strain No. | % Conversion to Pantoyl Lactone (Contact Time 72 Hours) | Optical Rotation $[\alpha]_D$ Methanol |
|---|---|---|---|
| B. fulva | IMI 163641 | 95 | −27.5° |
| B. fulva | CBS 132.33 | <10 | — |
| B. fulva | QM 6766 | 86 | −27.6° |
| B. fulva | QM 6994 | 34 | −14.5° |
| B. fulva | NRRL 1125 | 87 | −27.3° |
| B. fulva | * CBS 146.48 | <10 | — |
| B. fulva | ATCC 10099 | 92 | −28.5°** |

*According to the Centraal bureau voor Schimmelcultures (CBS) catalog of strains (27th edition, 1968) B. fulva 146.48 CBS is reportedly the equivalent of B. fulva 1125 NRRL. However, two subcultures of B. fulva 146.48 CBS purchased from the CBS on separate occasions and tested as described in Example 1, failed to convert ketopantoyl lactone to pantoyl lactone with the same high yields and high degree of stereoselectivity as characterized by B. fulva 1125 NRRL.
**A different polarimeter was used for this test having an $[\alpha]_D$methanol for the pure D-[−] pantoyl lactone of −29.2 ± 0.3.

The procedure was then repeated for the strains B. fulva CBS 132.33 and B. fulva CBS 146.48 but using a substrate concentration of 10 mg./ml. of culture medium instead of 30 mg./ml. In this instance a 79 percent conversion to pantoyl lactone with an optical rotation $[\alpha]_D$methanol of −24.8° was obtained using CBS 132.-33 and an 82 percent conversion and an $[\alpha]_D$methanol of −20.3° was obtained for CBS 146.48.

EXAMPLE A

This example illustrates methods, similar to that described by Kuhn and Wieland, Ber. Deut. Chem. Ges., 75B, pages 121–123 (1942), for microbiologically reducing α-ketopantoyl lactone to pantoyl lactone using representative brands of baker's yeast as the microorganism. In this example 150 g. of a compressed cake of baker's yeast cells, of the brand identified herein below in Table A, was added to 500 ml. of distilled water. A nutrient-substrate medium is then prepared by dissolving 50 g. of glucose, 37.5 g. of sodium dihydrogen phosphate and 25 g. of α-ketopantoyl lactone in 500 ml. of distilled water. The yeast cell suspension is then mixed with the nutrient-substrate solution yielding about 1200 ml. of reaction solution having a pH of about 3.2 to 3.5. The reaction mixture is then agitated and aerated at a temperature of about from 30° to 32°C for 24 hours. One milliliter samples are periodically aseptically withdrawn from the culture medium and acidified to a pH of about 0.8 to 1.0 with concentrated hydrochloric acid and then maintained at 50°C for 15 minutes to ensure that all of the pantoates, present in the sample, are converted to the corresponding lactone. The samples are then saturated with sodium chloride and extracted with 4 ml. of ethyl acetate. A portion of the ethyl acetate extract is then subjected to quantitative gas-liquid chromatography to determine the amount of α-ketopantoyl lactone and pantoyl lactone in the sample and correspondingly the percent conversion. The percent conversion profile with respect to time is summarized herein below in Table A.

At the end of the 24 hour reaction period, pantoyl lactone is recovered from the culture by differential extraction, as described in Example 1. The yeast cells were removed from the culture broth by centrifugation and the supernatant fluid recovered and adjusted to pH of about 7.3 by the addition of sodium hydroxide and extracted three times with half volumes of ethyl acetate. The extracts are combined, dried over anhydrous sodium sulfate and then evaporated under vacuum to remove the solvent. A sample of the crude residue is then taken and examined by gas-liquid chromatography to ensure that the residue is free of unreacted ketopantoyl lactone. One hundred milligram samples of the crude residue were then dissolved in 10 ml. of a 60:40 (vol.) mixture of benzene:ethyl acetate. Three hundred grams of silica gel is then added and the resulting mixture slurried and filtered through a Teflon membrane. The filtrate is then evaporated to remove the solvent. The optical rotation of the residue is then determined by dissolving the residue in water and then determining optical rotation on an automatic polarimeter. The optical rotation of pure D-[−] pantoyl lactone in water (i.e., $[\alpha]_D$ H$_2$O) is −50.5°. The optical rotation of the products using the various brands of baker's yeast are summarized below in Table A-1.

TABLE A

| | Percent[a] Conversion of Ketopantoyl Lactone to Pantoyl Lactone by Baker's Yeast | | |
|---|---|---|---|
| Reaction Time (hr) | Fleischmann | Red Star | Anheuser-Bush |
| 2 | 35 | 47 | 26 |
| 4 | 55 | 69 | 55 |
| 8 | 76 | 81 | 71 |
| 12 | 85 | 85 | 82 |
| 24(final) | 93 | 91 | 92 |

[a] avg. of four determinations

TABLE A-1

| | Optical Rotation in Water ($[\alpha]_D H_2O$) ($[\alpha]_D H_2O$) for Pure D–[–] Pantoyl Lactone = –50.5° | | |
|---|---|---|---|
| Reaction Time (hr) | Fleischmann[=1] | Red Star[=2] | Anheuser-Bush[=3] |
| 24 final | –23.2° | –23.3° | –22.9° |

[=1]sold under the Trademark Fleischmann Baker's Yeast by the Fleischmann Malting Company.
[=2]sold under the Trademark Red Star Baker's Yeast by the Red Star Division of Universal Food Corporation.
[=3]sold under the Trademark Anheuser-Bush by Anheuser-Busch, Inc.

EXAMPLE B

This example illustrates that recrystallization purification procedures such as used by Kuhn and Wieland in zur Biogenese der Pantothensauve, Ber deut. chem. Ges, 75B, 121–123 inherently cause selective resolutions, i.e., concentration of the D–[–] isomer in the crystal crop (SUPRA). In this example, product samples prepared according to Example A using Red Star yeast and having an initial $[\alpha]_D H_2O = -26.6 \pm 2.7$ as determined following separation by differential extraction is purified by two sequential recrystallizations from mixtures of diethyl ether:petroleum ether. The optical rotation (in water) of the sample was determined after the first recrystallization and found to be $[\alpha]_D H_2O = -41.7 \pm 1.1°$. This first crystal crop was again recrystallized and the optical rotation was determined and found to have increased to $[\alpha]_D H_2O = -49.6 \pm 0.8$. Thus, specific rotation data obtained for samples of pantoyl lactone recovered from various microbial fermentations employed to reduce ketopantoyl lactone will give falsely high impressions of the degree of microbial stereoselectivity if the samples are purified by recrystalization prior to testing.

EXAMPLE C

This example illustrates a screening procedure used to examine the possible ability of various microorganisms to stereoselectively reduce α-ketopantoyl lactone to D–[–] pantoyl lactone. In this example the procedure of Example 1 is followed but using the respective microorganism identified herein below in Table 2 and using a substrate concentration of only 10 mg. of α-ketopantoyl lactone per ml. culture medium and a substrate contact time of 48 hours. Also in this case, a nutrient medium is used containing 30 g. glucose, 5 g. yeast extract, 5 g. soybean meal, 5 g. sodium chloride, 5 g. $K_2HPO_4$ in 100 ml. of distilled water (pH adjusted to 6.5 by the addition of hydrochloride acid) was used to incubate the microorganism. The results of this example are summarized in the following table.

TABLE 2

| Microorganism | Depository Strain Accession No. | % Conversion to Pantoyl Lactone (48 HR) | Optical Rotation Unasterized Values refer to $[\alpha]_D$ methanol;*-values refer to $[\alpha]_D H_2O$ |
|---|---|---|---|
| Aspergillus niger | 164 sy ** | 66 | –9.0°* |
| Cephalosporium acremonium | 1135 sy | 60 | +11.7° |
| Cladosarum olivaceum | 1147 sy | 98 | –8.7° |
| Geotrichum candidum | 217 sy | 72 | –27.9°* |
| Gliocladium vermoseni | 1188 sy | 71 | 0 |
| Paecilomyces varioti | 1227 sy | 81 | +22.2° |
| Penicillium notatum | 1252 sy | 85 | +7.7° |
| Trichothecium roseum | 1325 sy | 21 | +0.8° |
| Verticillium albo-atrum | 1329 sy | 70 | +9.3° |
| Alternaria species | 120 sy | 72 | +7.6° |
| Curvularia lunata | 1165 sy | 75 | –3.6° |
| Helminthosporium species | 1192 sy | 67 | –15.1° |
| Epicoccum huminicola | 1176 sy | 66 | –8.1° |
| Fusarium solani | 1183 sy | 68 | –32.9°* |
| Candida albicans | 205 sy | 55 | –36.7°* |
| Rhodotorula aurantiaca | 228 sy | 20 | –1.4°* |
| Heterocephalum aurantiacum | 1193 sy | 46 | –27.2°* |
| Torulopsis utilis | 2101 sy | 51 | –36.0°* |
| Chaetomella oblongeta | 1137 sy | 40 | –22.9°* |
| Coniothryium species | 1152 sy | 76 | –5.7° |
| Pycnosporium species | 1286 sy | 70 | +4.4° |
| Colletotrichum coccocles | 1151 sy | 69 | –7.5°* |
| Byssochlamys nivea | 1126 sy | 63 | –24.8° |
| Dipodascus uninucleatus | 1173 sy | 75 | –2.8° |
| Monascus species | 1202 sy | 72 | –11.9° |
| Thielavia sepedonium | 1321 sy | 65 | –11.0° |

TABLE 2—Continued

| Microorganism | Depository Strain Accession No. | % Conversion to Pantoyl Lactone (48 HR) | Optical Rotation Unasterized Values refer to $[\alpha]_D$ methanol;*-values refer to $[\alpha]_D H_2O$ |
|---|---|---|---|
| Gibberella zeae | 1187 sy | 79 | +12.9° |
| Neurospora crassa | 1220 sy | 63 | +8.6° |
| Psilocybe sarcocephala | 1285 sy | 47 | −10.8° |
| Schizophyllum commune | 1300 sy | 20 | −16.5° |
| Absidia glauca | 109 sy | 77 | +26.3° |
| Mucor rammannianus | 1212 sy | 69 | +17.2° |
| Mycotypha species | 1216 sy | 88 | +22.1° |
| Rhizopus stolonifer | 1297 sy | 68 | +13.1° |
| Cunninghamella blakesleeana | 1156 sy | 61 | −15.5°* |
| Mortierella isabellina | 1204 sy | 74 | +3.0°* |

**sy refers to Syntex Corporation identification numbers. $[\alpha]_D$methanol for pure D-[−] pantoyl lactone is −27.8 (±0.1). $[\alpha]_D H_2O$ for pure D-[−] pantoyl lactone is −50.5°.

As can be seen from the above Table, the ability to reduce ketopantoyl lactone to pantoyl lactone is widespread among diverse genera of microorganisms. However, equally widespread is the absence of the favorable combination of stereoselectivity and conversion exhibited by the strains of *Byssochlamys fulva* and particularly the high stereoselectivity exhibited by *Byssochlamys fulva* 1125 NRRL, QM 6766, ATCC 10099, 135.62 CBS and 163641 IMI.

EXAMPLE 2

This example illustrates a larger scale application of the microbiological process of the invention. In this example 1.2 liters of a nutrient medium containing 4 percent (wt/vol) glucose and 3 percent (wt/vol) of the protein nutrient mixture sold under the trademark Pharmamedia by Traders Division, in distilled water is transferred to a two liter fermentation vessel and sterilized by autoclaving at 121°C. The sterile medium is then innoculated with 24 ml. of an innoculum of *Byssochlamys fulva* 1125 NRRL, prepared in the same manner as Example 1, and then incubated for 72 hours at 28°C, with agitation at about 400 rpm and aeration at the rate of one volume of air per volume of medium per minute. Then the contents of the two liter fermentor is aseptically transferred to a larger fermentor containing approximately 140 liters of a fresh nutrient medium having the same composition as the original nutrient medium. The medium in the larger fermentor is then incubated in the same manner as before but using an agitation of 300 rpm' s. Foaming is controlled during the incubation by the automatic addition of a silicone antifoamer. The incubation is continued for 48 hours and then 4.5 kg. of α-ketopantoyl lactone (approximately 99 percent wt. pure containing approximately 1 percent racemic pantoyl lactone as an impurity) dissolved in 12 liters of distilled water, and previously sterilized by autoclaving, is added aseptically to the fermentor. Substrate concentration is approximately 30 mg./per ml. of culture medium. Incubation is continued as before and samples were periodically withdrawn and analyzed by quantitative gas chromatography. After 90 hours, the reduction reaction was then terminated and a small sample was removed and analyzed for optical rotation in the same manner as described in Example A. The results of the sampling and final conversion and optical rotation are summarized in the following table:

TABLE X

| Time of Sampling (HRS.) | % Conversion to Pantoyl Lactone |
|---|---|
| 24 | 48 |
| 48 | 86 |
| 72 | 90 |
| 90 | 92 |

The optical rotation of the final sample is determined to be $[\alpha]_D$methanol = −27.1° versus −27.8 (±0.1) for pure D-[−] pantoyl lactone. Thus, in view of the fact that the initial starting material contained about 1 percent racemic pantoyl lactone or approximately 0.5 percent L-[+] pantoyl lactone, it is apparent that even on a large scale the above process is approximately 100 percent stereoselective to the desired D-[−] isomer.

Obviously many modifications and variations of the invention, described herein above and below in the Claims, can be made without departing from the essence and scope thereof.

What is claimed is:

1. A microbiological process for preparing optically active isomers selected from the group consisting of D-[−] pantoic acid; D-[−] pantoyl lactone and mixtures thereof; which comprises contacting a substrate comprising α-ketopantoic acid or α-ketopantoyl lactone with a culture of the fungus *Byssochlamys fulva* in a *Byssochlamys fulva* nutrient medium under aerobic conditions at pHs of about from 2 to 4, temperatures of about from 25° to 37°C and substrate concentrations of about from 1 to 6 grams of substrate per 100 ml. of the culture-nutrient medium.

2. The process of claim 1 wherein said substrate is selected from the group consisting essentially of α-ketopantoic acid; α-ketopantoyl lactone and mixtures thereof.

3. The process of claim 1 wherein said substrate is contacted with said culture for about from 48 to 72 hours.

4. The process of claim 1 wherein said strain of *Byssochlamys fulva* is selected from the group of *Byssochlamys fulva* 1125 NRRL, *Byssochlamys fulva* 135.62 CBS, *Byssochlamys fulva* QM 6766, *Byssochlamys fulva* 163641 IMI, and *Byssocylamys fulva* ATCC 10099.

5. The process of claim 4 wherein said substrate is contacted with said culture at pHs of about from 2.4 to 2.6.

6. The process of claim 4 wherein said substrate is contacted with said culture at temperatures of about from 27° to 30°C.

7. The process of claim 6 wherein said substrate is contacted with said culture at pHs of about from 2.4 to 2.6.

8. The process of claim 1 wherein said substrate and culture-nutrient medium are agitated to facilitate contract of the culture with fresh substrate and nutrients.

9. The process of claim 4 wherein a substrate concentration of about from 2 to 4 grams of substrate per 100 ml. of culture-nutrient medium is used.

* * * * *